(12) United States Patent
Sohler

(10) Patent No.: US 7,424,208 B2
(45) Date of Patent: Sep. 9, 2008

(54) PORTABLE DOWNLOAD UNIT INCLUDING A MEMORY CHIP-TO-CD BURNER

(76) Inventor: Alan W. Sohler, 14780 SW. Holly Hill Rd., Hillsboro, OR (US) 97123

( * ) Notice: Subject to any disclaimer, the term of this patent is extended or adjusted under 35 U.S.C. 154(b) by 1383 days.

(21) Appl. No.: 09/999,784

(22) Filed: Oct. 23, 2001
(Under 37 CFR 1.47)

(65) Prior Publication Data

US 2003/0077076 A1 Apr. 24, 2003

(51) Int. Cl.
*H04N 5/91* (2006.01)
(52) U.S. Cl. .................... 386/124; 386/46; 386/117
(58) Field of Classification Search ............. 386/46, 386/117, 124–126; 348/220, 231; 358/909; 369/44, 59, 124
See application file for complete search history.

(56) References Cited

U.S. PATENT DOCUMENTS 6,020,982 A * 2/2000 Yamauchi et al. ........... 358/444
6,041,028 A * 3/2000 Quan et al. .............. 369/44.34
6,658,202 B1 * 12/2003 Battaglia et al. ............ 386/117
6,987,927 B1 * 1/2006 Battaglia et al. ............ 386/117

* cited by examiner

*Primary Examiner*—Thai Tran
*Assistant Examiner*—Mishawn Dunn
(74) *Attorney, Agent, or Firm*—Blakely, Sokoloff, Taylor & Zafman LLP

(57) ABSTRACT

In an embodiment, a portable download device may include a card port for receiving a memory card from a digital camera and a compact disc (CD) reader/writer unit to write digital image data from the memory chip in the card to a removable CD and then reset the memory chip for reuse. The portable download device may include a display device, such as a liquid crystal display, to selectively view digital images generated from data in the memory chip card or the CD.

15 Claims, 3 Drawing Sheets

PORTABLE DOWNLOAD UNIT INCLUDING A MEMORY CHIP-TO-CD BURNER

BACKGROUND

Digital cameras store photographic images as digital information. The amount of information in a digital image file ranges in size depending of several factors including, for example, quality, number of pixels in a frame, resolution, color or black and white imaging, and the type of compression used in the generating the file. As the pixel density in sensors become greater, storage requirements for digital photographs may increase.

Digital cameras store the digital photographs in memory chips. The memory chips may be encased in the camera housing and/or in removable memory cards which may be inserted into a receptacle in the camera housing. The memory cards may be PCMCIA (Personal Computer Memory Card International Association) cards, or "PC cards" which conform to a particular standard, e.g., Type II or Type III PCMCIA.

The memory chip may be considered a digital film roll. The number and size of the memory chips available to the operator of a particular camera determine the number of digital photographs the operator can take and preserve in a given outing. The memory chips are relatively expensive and have relatively small capacity compared to traditional portable storage media for digital information, e.g., magnetic film and discs, and compact discs (CDs). This limits the capacity of the digital camera.

DETAILED DESCRIPTION

Figure 1:
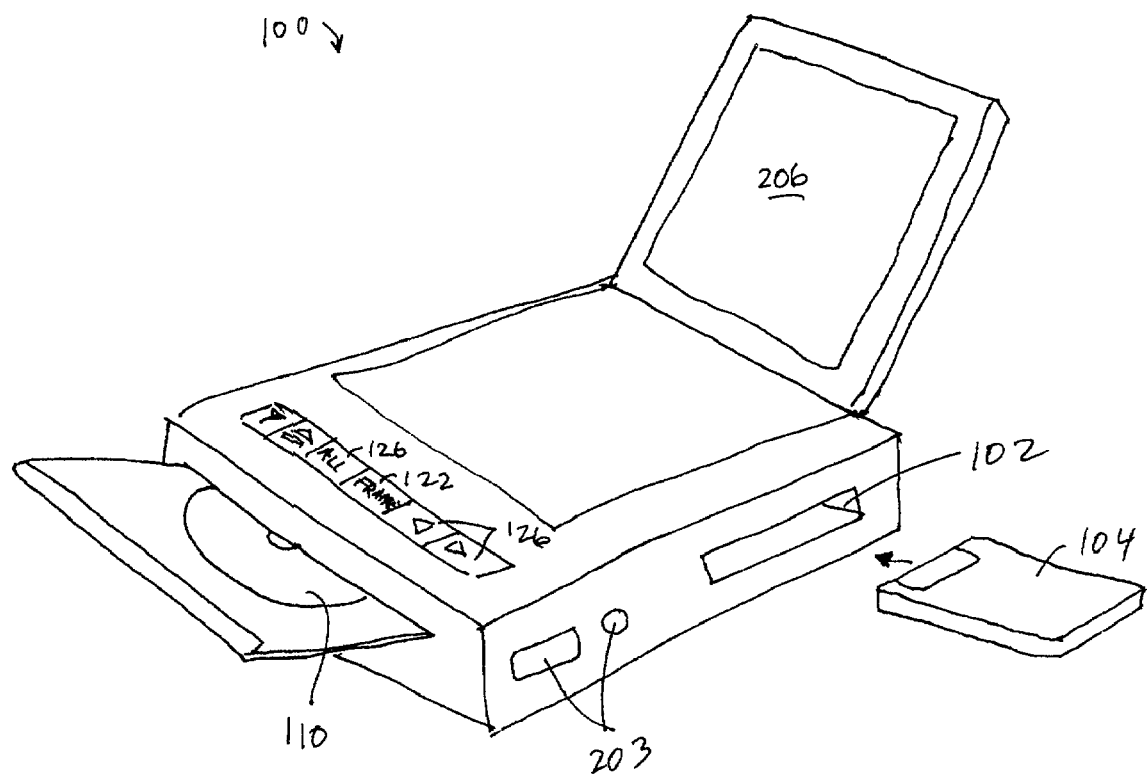
FIG. 1 is a perspective view of a portable download unit according to an embodiment.

FIG. 1 illustrates a portable download unit 100 according to an embodiment. The portable download unit 100 is a portable device which may be used in conjunction with a digital camera to download and store digital photograph files on an optical disc, e.g., a rewritable compact disc (CD-RW), enabling the operator of the digital camera to take and preserve more pictures in a given outing where typical download devices, e.g., a personal computer (PC) or laptop computer, are unavailable. The portable download unit may be battery operated and relatively lightweight and compact compared to typical download devices, for example, having side dimensions less than about 8 inches and weighing under five pounds. The CDs act as relatively cheap, portable, and high capacity digital "film rolls."

In digital photography, an image is focused on an array of pixels in a sensor. The sensor may be, for example, a charge-coupled device (CCD) sensor or active pixel sensor (APS). Each pixel in the array includes a light sensitive diode that creates an electric signal in response to the number of photons it receives during an exposure.

A pixel in the array may include one transistor for black and white photography or several transistors for color. The analog electric signals are passed to an analog-to-digital converter (ADC) that converts the analog signals to digital signals. The digital information may be passed to a digital signal processor (DSP) that is programmed to manipulate the photographic images. The DSP may, for example, adjust the contrast and detail in the image, compress the data so that it takes up less storage space, and send the data to the camera's storage medium.

The digital information may be formatted into different types of image files. The image formats may include data compression, e.g., JPEG (Joint Photographic Experts Group) and GIF (graphics interchange format), or no compression, e.g., TIFF (tagged image file format). The size of the file depends on several factors, including, for example, the type and degree of compression, the size of the sensor (in pixels), the resolution of the picture, and whether the image is black-and-white or color.

The size of a digital photograph image file can vary greatly. For example, a compressed, low resolution photographic image file produced with a standard VGA (video graphics array) sensor (640×480 pixels) may require on the order of 64 kB of memory, whereas a high quality photographic image file produced with a 2.7 MP (Mega Pixel) CCD sensor may require over 8 MB of memory to store. The digital photograph industry is increasing the size of the file to improve the image quality.

The image file may be stored on an internal memory device, for example, a flash memory chip or writable disc, and/or a removable memory card. The memory card includes a memory chip housed in a casing that may be inserted into a receptacle in the digital camera and removed and replaced with another card when full. The memory cards may comply with a standard, such as Type I, II, or III PCMCIA (Personal Computer Memory Card International Association) cards, also referred to as PC cards or flash cards. Popular sizes for such memory cards are 4 MB, 8 MB, and 16 MB. Compact flash memory cards may store up to 128 MB. Typically the price of the card is proportional to its memory capacity.

The portable download unit 100 may include a receptacle 102 to accept such a removable memory card 104. The portable download unit 100 may also include an additional receptacle 106 and/or adaptors to accommodate different types of removable memory cards. The portable download unit 100 includes a CD reader/writer (R/W) unit 204 (FIG. 2), which can read and write to a rewritable CD (CD-RW) 110. Such a disc can store up to 650 MB of data. Alternatively, the portable download unit may include a DVD-RAM reader/writer unit. Such discs have a storage capacity of about 9.4 GB.

The portable download unit 100 may transfer the digital photographic information from the removable memory card to the rewritable CD. Since memory in memory cards currently run on the order of dollars per MB and rewritable CDs cost on the order of a dollar per disc (at 650 MB each), the portable download unit enables the use of CDs as relatively inexpensive, high capacity digital film rolls. A single memory card may be used and re-used in an extended photographic shoot or outing in which download to a PC may not be convenient or available.

Figure 2:
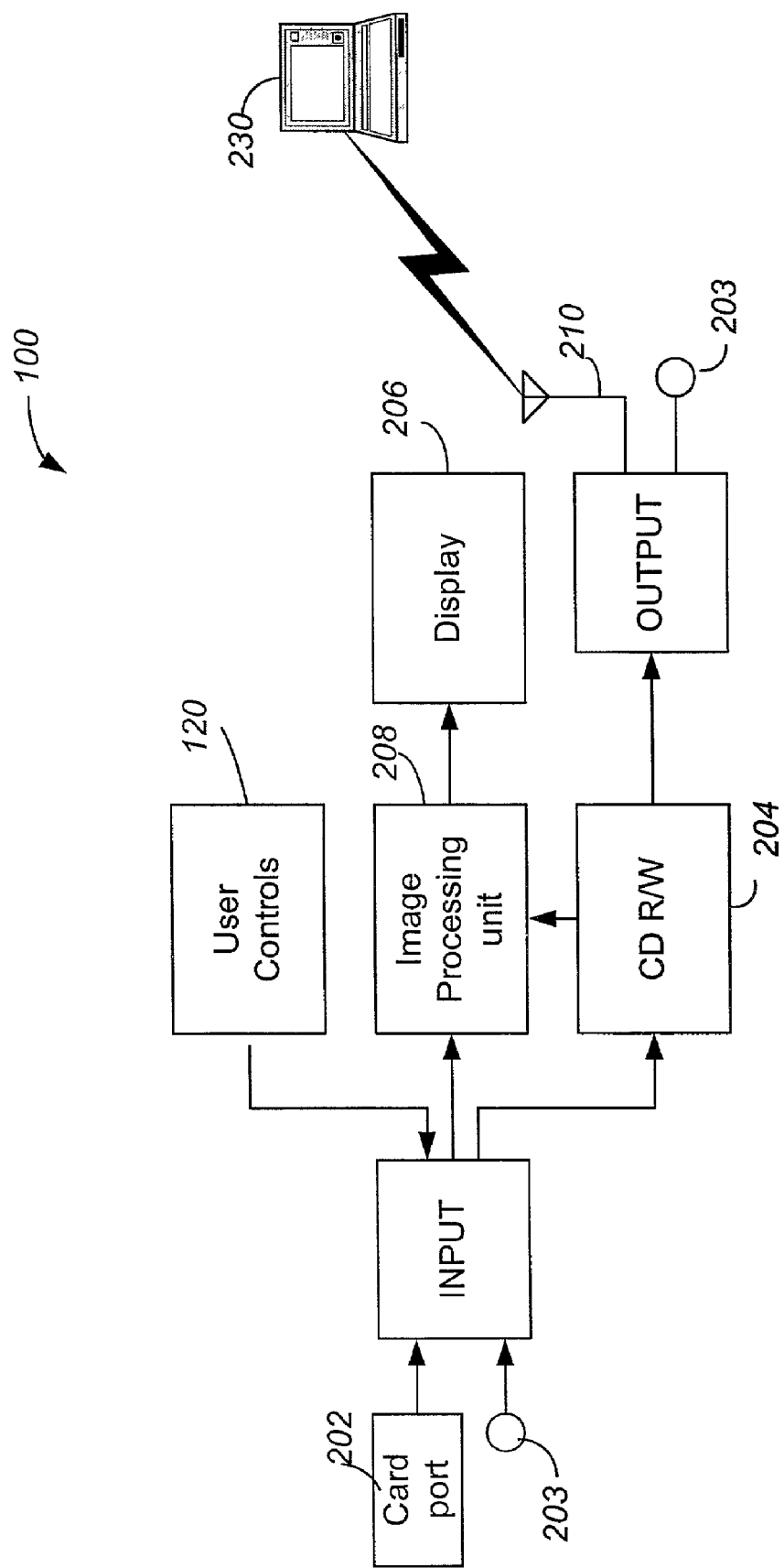
FIG. 2 is a block diagram of a portable download unit according to an embodiment.

FIG. 2 is a block diagram illustrating the functional units of the portable download unit 100. The unit includes a receptacle 202 for the memory card. The unit may also include input/output (I/O) ports 203, e.g., serial, USB (Universal Serial Bus), and/or SCSI (small computer system interface) ports, for connecting cables between the portable download unit and the digital camera. These ports may be used to download image files directly from the internal memory device in the digital camera and/or to download image files from the CD 110 to a PC.

A CD R/W unit 204 writes the photographic image file information from the digital camera memory device (e.g., a removable memory card or internal memory device) to the rewritable CD. A display device 206 may be used to view digital photographs stored in image files on the CD and/or the digital camera memory device. The display device 206 may be, for example, an integral or flip-up LCD display screen.

User controls 120 on the portable download unit chassis may be used to selectively view digital photographs, to initiate writing from the digital camera memory device to the CD, and to erase and format the memory card from the digital camera memory device for re-use.

The photograph image files may be in any of a number of different file formats, for example, JPEG, GIF, and TIFF. An image processing unit 208 prepares the image files for display on the display device 206.

The information on the CD may be output to a download device, e.g., a PC, via a cable connection from the I/O ports 203. The portable download unit 100 may also include an antenna 210 to transmit data wirelessly on a radio frequency (RF) channel.

Figure 3:
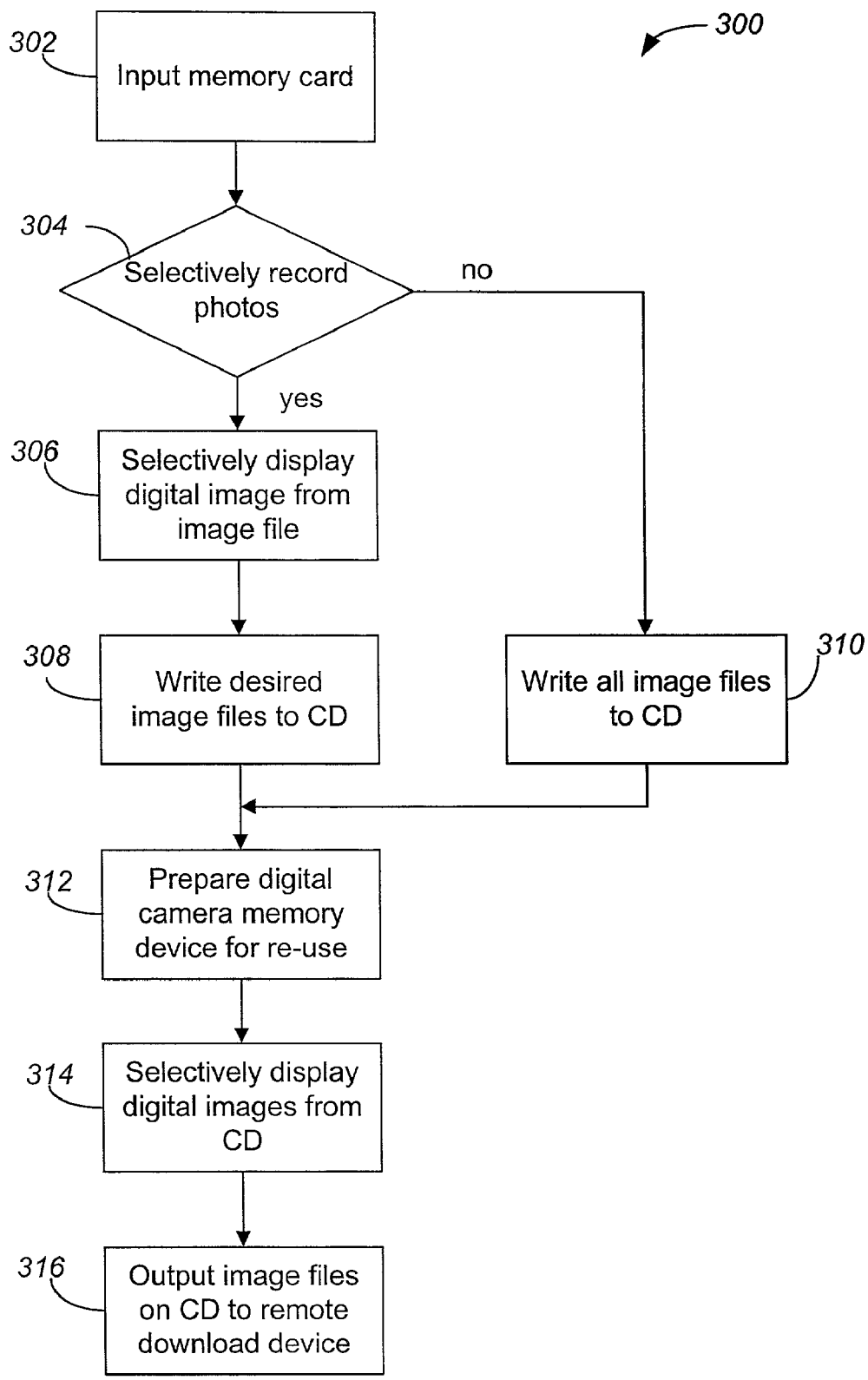
FIG. 3 is a flowchart describing a remote download operation according to an embodiment.

FIG. 3 illustrates a memory chip-to-CD download operation 300 according to an embodiment. A memory card including digital photograph image files is inserted into the receptacle 102 in the portable download unit 100 (block 302). The image files stored on the memory card 104 may be downloaded as a group, or individually to save storage space (block 304). To selectively write image files to the CD 110, the user operates the user control buttons 120 to display a selected digital photograph on the display device (block 306). The user then presses a control button 122 which causes the CD R/W unit to write the image file corresponding to the displayed photograph to the CD (block 308). Alternatively, the user may press a control button 124 which causes all image files on the memory card to be written to the CD (block 310). The user may selectively view the digital photographs stored in the image files written to the CD using tracking and control buttons 126.

The memory card may then be prepared for re-use (block 312). This may include erasing all image files from the memory card and reformatting or resetting the memory chip.

The user may transmit the image files on the CD 110 to a remote download device 230. The transmission may be to a PC via a wireless connection, for example, Bluetooth, a wireless technology and protocol for short range frequency hopping radio link between devices, or the image files may be transmitted via a digital cellular phone channel. The image files may be transmitted as a group, or selectively, as with the CD writing operation described above.

A number of embodiments have been described. Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

The invention claimed is:

1. An apparatus comprising:
    a portable housing;
    an input port operative to receive digital image data;
    an optical disc reader/writer (R/W) unit operative to write digital image data received from the input port to a removable optical disc and to read digital image data from said optical disc, wherein the R/W unit is operative to write digital image data corresponding to the displayed image to the optical disc in response to a second user command and to write all digital image data contained on a memory chip to the optical disc in response to a third user command;
    a display device; and
    an image processing unit operative to retrieve digital image data from the input port and from the optical disc and process said data for display on the display device, wherein the image processing unit is operative to selectively process and display one of a plurality of images from the digital image data received via the input port in response to a first user command.

2. The apparatus of claim 1, further comprising a portable power supply.

3. The apparatus of claim 1, wherein the apparatus weighs less than about five pounds.

4. The apparatus of claim 1, wherein the input port comprises a receptacle adapted to receive a memory device including the memory chip containing the digital image information.

5. The apparatus of claim 4, wherein the memory card comprises a flash card.

6. The apparatus of claim 1, wherein the input port comprises an input/output port adapted to receive a cable.

7. The apparatus of claim 1, wherein the optical disc comprises a rewritable compact disc.

8. The apparatus of claim 1, wherein the optical disc comprises a DVD-RAM disc.

9. The apparatus of claim 1, wherein the image processing unit is operative to selectively process and display one of a plurality of images from the digital image data received from the input port in response to a user command.

10. The apparatus of claim 1, further comprising a wireless transmitter operative to transmit digital image data from the optical disc to a remote device via a wireless communication link.

11. A portable download device comprising:
    a portable housing having a maximum side length of less than about eight inches;
    a memory card port adapted to receive a memory card including a memory chip operative to store digital image data;
    a memory chip reader operative to read digital image data from the memory chip and to reset the memory chip for reuse in response to a user command, wherein the R/W unit is operative to write digital image data corresponding to the displayed image to the optical disc in response to a second user command and to write all digital image data contained on the memory chip to the optical disc in response to a third user command;
    an optical disc reader/writer (R/W) unit operative to write digital image data received from the memory chip to a removable optical disc and to read digital image data from said optical disc;
    a liquid crystal display; and
    an image processing unit operative to retrieve digital image data from the input port and from the optical disc and process said data for display on the display device, wherein the image processing unit is operative to selectively process and display one of a plurality of images from the digital image data received from the memory chip reader in response to a first user command.

12. The device of claim 11, wherein the R/W unit comprises a compact disc R/W unit.

13. The device of claim 11, further comprising a wireless transmitter operative to transmit digital image data from the optical disc to a remote device via a wireless communication link.

14. The device of claim 13, wherein the wireless communication link comprises a Bluetooth connection.

15. The device of claim 11, wherein the R/W unit comprises a DVD-RAM disc.

* * * * *